(12) United States Patent
Brush et al.

(10) Patent No.: US 10,370,482 B2
(45) Date of Patent: *Aug. 6, 2019

(54) LACTAM-FUNCTIONALIZED POLYMER, COMPOSITIONS AND APPLICATIONS THEREOF

(71) Applicant: HERCULES LLC, Wilmington, DE (US)

(72) Inventors: Kelly A. Brush, Newark, DE (US); Todd A. Brugel, Wilmington, DE (US)

(73) Assignee: HERCULES LLC, Wilmington, DE (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/636,991

(22) Filed: Jun. 29, 2017

(65) Prior Publication Data

US 2018/0002480 A1 Jan. 4, 2018

Related U.S. Application Data

(60) Provisional application No. 62/357,442, filed on Jul. 1, 2016.

(51) Int. Cl.
| | |
|---|---|
| *C08F 283/06* | (2006.01) |
| *C08F 8/30* | (2006.01) |
| *C08G 18/48* | (2006.01) |
| *C08G 18/72* | (2006.01) |
| *C08G 69/14* | (2006.01) |
| *C08G 18/83* | (2006.01) |
| *C09D 171/02* | (2006.01) |
| *C08G 65/333* | (2006.01) |
| *C08G 65/337* | (2006.01) |

(52) U.S. Cl.
CPC ............ *C08G 18/833* (2013.01); *C08F 8/30* (2013.01); *C08F 283/065* (2013.01); *C08G 18/48* (2013.01); *C08G 18/728* (2013.01); *C08G 65/337* (2013.01); *C08G 65/33327* (2013.01); *C08G 69/14* (2013.01); *C09D 171/02* (2013.01); *C08F 2810/40* (2013.01)

(58) Field of Classification Search
CPC .... C08F 283/065; C08F 8/30; C08F 2810/40; C08G 18/48; C08G 18/728; C08G 18/833; C08G 69/14
See application file for complete search history.

(56) References Cited

U.S. PATENT DOCUMENTS

| | | | |
|---|---|---|---|
| 5,037,930 A | 8/1991 | Shih | |
| 5,574,127 A | 11/1996 | Sau | |
| 6,162,877 A | 12/2000 | Sau | |
| 6,369,132 B2 | 4/2002 | Sau | |
| 6,479,573 B2 | 11/2002 | Burdick et al. | |
| 6,809,132 B2 | 10/2004 | Sau | |
| 7,531,591 B2 | 5/2009 | Bakeev et al. | |
| 7,550,542 B2 | 6/2009 | Bakeev et al. | |
| 8,748,542 B2 | 6/2014 | Bakeev et al. | |
| 2016/0237247 A1* | 8/2016 | Hawkins | C08K 5/521 |

FOREIGN PATENT DOCUMENTS

WO WO2014116560 A1 7/2014

OTHER PUBLICATIONS

Journal of Polymer Science_Part A_Polymer Chemistry 2015_53_68-78.

* cited by examiner

*Primary Examiner* — Irina S Zemel
*Assistant Examiner* — Jeffrey S Lenihan
(74) *Attorney, Agent, or Firm* — William J. Davis; Nathalie Tietcheu

(57) ABSTRACT

A lactam-functionalized polymer is disclosed. The lactam-functionalized polymer includes lactam-functionalized polyacetal polyether, polyhemiaminal polyether or polyaminal polyether. The applications of the lactam-functionalized polymer are also disclosed.

20 Claims, No Drawings

LACTAM-FUNCTIONALIZED POLYMER, COMPOSITIONS AND APPLICATIONS THEREOF

CROSS REFERENCE TO RELATED APPLICATIONS

The present application claims the benefit under 35 U.S.C. 119 (e) of U.S. Provisional Patent Application Ser. No. 62/357,442, filed on Jul. 1, 2016, the entire content of which is hereby expressly incorporated herein by reference.

BACKGROUND OF THE INVENTION

1. Field of the Disclosed and Claimed Inventive Concepts

The presently disclosed process(es), procedure(s), method(s), product(s), result(s), and/or concept(s) (collectively referred to hereinafter as the "present disclosure") relates generally to a lactam-functionalized polymer comprising a polymer backbone and at least one lactam moiety attached to the polymer backbone. In particular, the polymer backbone can be polyacetal polyether, polyhemiaminal polyether, or polyaminal polyether. Additionally, the present disclosure relates generally to compositions comprising the lactam-functionalized polymers and applications thereof in various industrial areas such as coatings.

2. Background and Applicable Aspects of the Presently Disclosed and Claimed Inventive Concept(s)

Water-soluble polymers (also commonly referred to as "thickeners" or "rheology modifiers") are widely used in many industrial water-borne systems as additives to modify their flow behavior. Thickeners increase and maintain viscosity at required levels under specified processing conditions and end use situations. Thickeners are useful, for example, in decorative and protective coatings, paper coatings, cosmetics and personal care products, detergents, pharmaceuticals, adhesives and sealants, agricultural formulations, and petroleum drilling fluids.

One such highly filled aqueous system where the thickener is used in a decorative and protective coating is latex paint, which is composed of a dispersion of polymeric latex, pigments, clays, and other additives in water.

Thickeners can be materials that are either naturally existing or synthetically manufactured. Natural thickeners, for example, can include casein, alginates, gum tragacanth, guar, xanthan gum, locust and bean gum. Typical examples of naturally derived thickeners can include cellulose ethers derived from celluloses, such as hydroxyethyl cellulose (HEC), hydroxypropyl cellulose (HPC), and carboxymethyl cellulose (CMC). These natural and naturally derived products (hereinafter called "natural products") vary in their thickening efficiency. One of the drawbacks of the naturally based thickeners is that they are subject to microbial attack and hence, addition of antimicrobial agents to the formulation is required. Synthetic thickeners include various acrylic polymers, alkylene oxide polymers, amide polymers, and maleic anhydride polymers. These synthetic thickeners can be either homopolymers or copolymers. The hydrolytic stability of some polymers depends on the pH of the solution and others are sensitive to various components normally found in aqueous coatings.

Typically, a small amount (about 0.1-5.0 wt %) of water-soluble polymer is added to latex paint to achieve the following performance characteristics during manufacturing, storage, and applications: a) ease of formulation, b) prevention of settling of the suspended particles (latex, pigment, etc.) during storage, c) good film build during applications to achieve efficient hiding without excessive brush or roller drag, d) good roller spatter resistance, e) no excessive sagging after application on a vertical surface, and f) good flow and leveling for the formation of a smooth and continuous film with good appearance.

The above mentioned natural and synthetic thickeners provide different degrees of thickening efficiency and application properties. However, they invariably fail to provide all of the key performance properties in gloss paints. These key properties include good film build, flow and leveling, and gloss which are generally offered by solvent-based alkyd paints. Another drawback of these thickeners is that they may have poor compatibility with the various paint ingredients.

To eliminate the performance deficiencies of the conventional thickeners, a new class of thickeners, commonly referred to as "associative thickeners", has been developed and commercialized (See E. J. Schaller and P. R. Sperry, in "Handbook of Coatings Additives", Ed. L. J. Calbo, Vol. 2, p: 105, 1992; Marcel Dekker, Inc., New York). These thickeners include hydrophobically-modified water-soluble polymers. They undergo intermolecular association in aqueous solution and thereby exhibit enhanced solution viscosity. They can also adsorb onto the dispersed-phase particles of an aqueous dispersion and thereby form a three-dimensional network. Since they provide improved paint properties not offered by conventional thickeners, they have gained commercial importance.

Commercial nonionic synthetic thickeners exhibit often poor and variable compatibility in paints, as exemplified by syneresis, poor color acceptance, variable paint viscosity over time, and inadequate hiding power.

It has been found that novel polymers and compositions according to the present disclosure can provide, among many other performance attributes, the important benefits of improved rheological properties. The polymers and compositions thereof may advantageously be used in various industrial applications including coatings. Non-limiting examples of coating applications include improved hide of the coating compositions on substrates.

DETAILED DESCRIPTION

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations may be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described circumstance completely occurs or that the subsequently described circumstance occurs to a great extent or degree.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that may vary depending upon the desired properties to be obtained in carrying out the invention.

The term "alkyl" refers to a saturated linear or branched hydrocarbon group of 1 to 50 carbons.

The term "alkylene" as used herein refers to an unsaturated, linear or branched hydrocarbon group of 1 to 50 carbon atoms with one or more carbon-carbon double bonds.

The term "aryl" refers to a mono- or polynuclear aromatic hydrocarbon group including carbocyclic and heterocyclic aromatic groups.

The term "monomer" refers to a small molecule that chemically bonds during polymerization to one or more monomers of the same or different kind to form a polymer.

The term "polymer" refers to a large molecule comprising one or more types of monomer residues (repeating units) connected by covalent chemical bonds. By this definition, polymer encompasses compounds wherein the number of monomer units may range from very few, which more commonly may be called as oligomers, to very many. Non-limiting examples of polymers include homopolymers, and non-homopolymers such as copolymers, terpolymers, tetrapolymers and the higher analogues.

The term "heteroatom" refers to oxygen, nitrogen, sulfur, silicon, phosphorous, or halogen. The heteroatom(s) may be present as a part of one or more heteroatom-containing functional groups. Non-limiting examples of heteroatom-containing functional groups include ether, hydroxyl, epoxy, carbonyl, carboxamide, carboxylic ester, carboxylic acid, imine, imide, amine, sulfonic, sulfonamide, phosphonic, and silane groups. The heteroatom(s) may also be present as a part of a ring such as in heteroaryl and heteroarylene groups.

The term "moiety" refers to a part or a functional group of a molecule.

The term "acetal" refers to a functional group having two hydroxyl and/or oxyalkyl groups attached to the same carbon.

The term "aminal" refers to a functional group having two amino and/or aminoalkyl groups attached to the same carbon.

The term "hemiaminal" refers to a functional group having one hydroxyl/oxyalkyl group and one amino/aminoalkyl group.

As used herein, "KU" refers to Krebs unit and is a measure of the mid-shear viscosity as measured by a Kreb-Stormer viscometer.

All percentages, ratio, and proportions used herein are based on a weight basis unless other specified.

The present disclosure is directed to a lactam-functionalized polymer comprising a polymer backbone and at least one lactam-containing moiety attached to the polymer backbone. The polymer backbone can be selected from the group consisting of polyacetal polyether, polyhemiaminal polyether, polyaminal polyether, and combinations thereof.

The at least one lactam-containing moiety can be attached to at least one end of the polymer backbone or pendant on the polymer backbone. The end(s) of the lactam-containing moieties can be in bunches. The pendant lactam-containing moiety may hang down from the polymer backbone in a uniform pattern, a random pattern or in bunches. The number of the at least one lactam-containing moiety in the lactam-functionalized polymer can be varied from 1 to 500, or from 1 to 200, or from 1 to 100, or from 1 to 50.

The lactam-containing moiety herein refers to a molecule containing a cyclic amide. The lactam-containing moiety can be represented by a general formula (I):

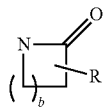
(I)

where R is a substituted or unsubstituted hydrocarbon diradical optionally having at least one heteroatom and is attached to a carbon or nitrogen atom on the lactam ring, and b is from 1 to 5.

In one non-limiting embodiment, R can be selected from the group consisting of a substituted or unsubstituted alkylene, alkenyl, aryl, alkylaryl, arylalkylene, arylalkenyl, cyclic, cycloaliphatic and polycyclic, optionally having at least one heteroatom. In another non-limiting embodiment, R can be an alkylene having 1 to 50 carbon atoms or 1 to 30 carbon atoms or 1 to 15 carbon atoms, optionally having at least one heteroatom.

In one aspect of the present disclosure, the at least one lactam-containing moiety can have one or both of the following general formulas:

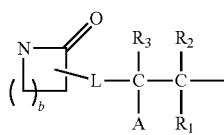
Formula (II)

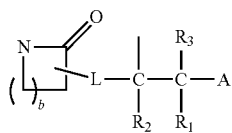
Formula (III)

where L is a direct bond, or a substituted or unsubstituted alkylene optionally having at least one heteroatom; A is hydrogen, $OX_nH$, $SX_nH$, or $NR_4X_nH$; $R_1$-$R_4$ are identical or different and are each independently hydrogen, linear or branched alkyl having 1 to 30 carbons, or saturated or unsaturated hydrocarbon rings having 3 to 10 carbons, optionally having at least one heteroatom; X is the lactam-containing moiety of Formula (II) or (III); n is from 0 to 500 or from 0 to 200 or from 0 to 100 or from 0 to 50; and b is from 1 to 5.

The lactam-containing moiety of the present disclosure can also be represented by a general formula (IV):

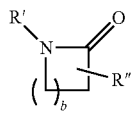
(IV)

wherein R' and R" are identical or different and are each independently hydrogen or a substituted or unsubstituted hydrocarbon diradical optionally having at least one heteroatom, and R" is attached to a carbon atom on the lactam ring, and b is from 1 to 5 with the proviso that R' or R" or both R' and R" are a substituted or unsubstituted hydrocarbon diradical optionally having at least one heteroatom.

In one non-limiting embodiment, R' and R" are identical or different and are each independently selected from the group consisting of a substituted or unsubstituted alkylene, alkenyl, aryl, alkylaryl, arylalkylene, arylalkenyl, cyclic, cycloaliphatic and polycyclic, optionally having at least one heteroatom. In another non-limiting embodiment, R' and R" are identical or different and are each independently an alkylene having 1 to 30 carbon atoms, optionally having at least one heteroatom.

In another non-limiting embodiment, R' and R" are identical or different and are each independently hydrogen,

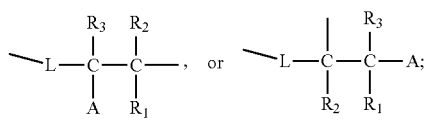

wherein L is attached to the lactam ring, and is a direct bond, or a substituted or unsubstituted alkylene optionally having at least one heteroatom; A is hydrogen, $OX_nH$, $SX_n$ H, or $NR_4X_nH$; $R_1$-$R_4$ are identical or different and are each independently hydrogen, linear or branched alkyl having 1 to 30 carbons, or saturated or unsaturated hydrocarbon rings having 3 to 10 carbons, optionally having at least one heteroatom; X is the lactam-containing moiety of Formula (IV); n is from 0 to 500; and b is from 1 to 5 with the proviso that R' or R" or both R' and R" are a substituted or unsubstituted hydrocarbon diradical optionally having at least one heteroatom.

The lactam-containing moiety can comprise a general lactam structure including β-lactam, γ-lactam, δ-lactam and ε-lactam. In one non-limiting embodiment, the lactam-containing moiety can comprise a lactam structure including β-propiolactam, γ-butyrolactam, δ-valerolactam and ε-caprolactam.

The lactam-functionalized polymer described herein above can further comprise at least one hydrophobic moiety to form a hydrophobically modified lactam-functionalized polymer. The at least one hydrophobic moiety can be attached to at least one end of the lactam-functionalized polymer or pendant on the lactam-functionalized polymer. The end(s) of the hydrophobic moieties can be in bunches. The pendant hydrophobic moiety may hang down from the lactam-functionalized polymer in a uniform pattern, a random pattern or in bunches.

The present disclosure is also directed to a lactam-functionalized and hydrophobically modified polymer comprising a polymer backbone, and at least one lactam-containing moiety and at least one hydrophobic moiety that are attached to the polymer backbone. The polymer backbone can be selected from the group consisting of polyacetal polyether, polyhemiaminal polyether, polyaminal polyether, and combinations thereof. The at least one lactam-containing moiety and the at least one hydrophobic moiety can be attached to the ends of the polymer backbone or pendant on the polymer backbone. The end-attached lactam-containing moieties and hydrophobic moieties can be in a uniform pattern, a random pattern or in bunches. The pendant lactam-containing moiety and hydrophobic moiety may hang down from the polymer backbone in a uniform pattern, a random pattern or in bunches. The number of the at least one hydrophobic moiety in the lactam-functionalized polymer can be varied from 1 to 500, or from 1 to 200, or from 1 to 100, or from 1 to 50.

The lactam-containing moiety is the same as those described previously. The hydrophobic moiety can be selected from the group consisting of a substituted or unsubstituted alkyl, alkenyl, aryl, alkylaryl, arylalkyl, arylalkenyl, cyclic, cycloaliphatic, and polycyclic, optionally having at least one heteroatom.

In one non-limiting embodiment, the hydrophobic moiety can be a functionalized or unfunctionalized $C_1$-$C_{40}$ alkyl optionally having one or more heteroatoms. In another non-limiting embodiment, the hydrophobic group is a functionalized or unfunctionalized $C_4$-$C_{30}$ alkyl optionally having one or more heteroatoms. In yet another non-limiting embodiment, the hydrophobic group is a functionalized or unfunctionalized $C_6$-$C_{20}$ alkyl optionally having one or more heteroatoms.

Non-limiting examples of hydrophobic groups can include n-butyl, isobutyl, tert-butyl, n-pentyl, isopentyl, n-hexyl, n-heptyl, n-octyl, 2-ethylhexyl, tert-octyl, iso-norbornyl, n-nonyl, n-decyl, n-undecyl, n-dodecyl, tert-dodecyl, n-tridecyl, n-tetradecyl, n-pentadecyl, n-hexadecyl, n-heptadecyl, n-octadecyl, and n-eicosyl, lauryl, stearyl, 2-butyl-1-octyl, phenyl, cresyl, napthyl, halogenated hydrocarbons, a primary amino, a secondary amino, a tertiary amino, a quaternary amino, and a tertiary phosphino.

The lactam-functionalized polymers according to the present disclosure can have a weight average molecular weight ranging from about 1,000 Da to 10,000,000 Da. In one non-limiting embodiment, the lactam-functionalized polymers can have a weight average molecular weight ranging from about 5000 Da to 5,000,000 Da. In another non-limiting embodiment, the lactam-functionalized polymers can have a weight average molecular weight ranging from about 10,000 Da to 1,000,000 Da.

The present disclosure is directed to a method for preparing a lactam-functionalized polymer comprising: 1) reacting a hydroxyl polyether or hydroxyl polyetheramine with a gem-dihalide to form a polymer backbone; and 2) reacting the polymer backbone with at least one compound comprising at least one lactam moiety to form the lactam-functionalized polymer. The at least one compound comprising the at least one lactam moiety can further comprise at least one reactive functional group.

In one non-limiting embodiment, the at least one compound comprising at least one lactam moiety and at least one reactive functional group can have a general formula (V):

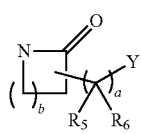
(V)

where Y is Cl, Br, I, F, OH, SH, or $NR_7R_8$; $R_5$ and $R_6$ are identical or different and are each independently hydrogen, Cl, Br, I, F, OH, SH, $NR_7R_8$, linear or branched alkyl having 1 to 30 carbons, or saturated or unsaturated hydrocarbon rings having 3 to 10 carbons, optionally having at least one heteroatom; $R_7$ and $R_8$ are identical or different and are each independently hydrogen, linear or branched alkyl having 1 to 30 carbons, or saturated or unsaturated hydrocarbon rings having 3 to 10 carbons, optionally having at least one heteroatom; a is from 1 to 20 or from 1 to 8; and b is from 1 to 5.

In another non-limiting embodiment, the at least one compound comprising at least one lactam moiety and at least one reactive functional group can have a general formula (VI):

(VI)

wherein W and W' are identical or different and are each independently hydrogen or

where Y is Cl, Br, I, F, OH, SH, or $NR_7R_8$; $R_5$ and $R_6$ are identical or different and are each independently hydrogen, Cl, Br, I, F, OH, SH, $NR_7R_8$, linear or branched alkyl having 1 to 30 carbons, or saturated or unsaturated hydrocarbon rings having 3 to 10 carbons, optionally having at least one heteroatom; $R_7$ and $R_8$ are identical or different and are each independently hydrogen, linear or branched alkyl having 1 to 30 carbons, or saturated or unsaturated hydrocarbon rings having 3 to 10 carbons, optionally having at least one heteroatom; a is from 1 to 20 or from 1 to 8; and b is from 1 to 5 with the proviso that W or W' or both W and W' are a substituted or unsubstituted hydrocarbon diradical optionally having at least one heteroatom.

In yet another non-limiting embodiment, the at least one compound comprising at least one lactam moiety and at least one reactive functional group can have a general formula (VII):

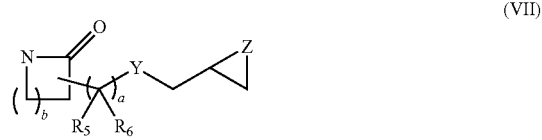
(VII)

where Y is O, S, or $NR_7$; Z is O, S, or $NR_7$; $R_5$ and $R_6$ are identical or different and are each independently hydrogen, Cl, Br, I, F, OH, SH, $NR_7R_8$, linear or branched alkyl having 1 to 30 carbons, or saturated or unsaturated hydrocarbon rings having 3 to 10 carbons, optionally having at least one heteroatom; $R_7$ and $R_8$ are identical or different and are each independently hydrogen, linear or branched alkyl having 1 to 30 carbons, or saturated or unsaturated hydrocarbon rings having 3 to 10 carbons, optionally having at least one heteroatom; a is from 1 to 20 or from 1 to 8; and b is from 1 to 5.

In yet another non-limiting embodiment, the at least one compound comprising at least one lactam moiety and at least one reactive functional group can have a general formula (VIII):

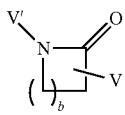  (VIII)

wherein V and V' are identical or different and are each independently hydrogen or

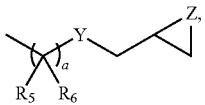

wherein Y is O, S, or $NR_7$; Z is O, S, or $NR_7$; $R_5$ and $R_6$ are identical or different and are each independently hydrogen, Cl, Br, I, F, OH, SH, $NR_7R_8$, linear or branched alkyl having 1 to 30 carbons, or saturated or unsaturated hydrocarbon rings having 3 to 10 carbons, optionally having at least one heteroatom; $R_7$ and $R_8$ are identical or different and are each independently hydrogen, linear or branched alkyl having 1 to 30 carbons, or saturated or unsaturated hydrocarbon rings having 3 to 10 carbons, optionally having at least one heteroatom; a is from 1 to 20 or from 1 to 8; and b is from 1 to 5 with the proviso that V or V' or both V and V' are a substituted or unsubstituted hydrocarbon diradical optionally having at least one heteroatom.

The method described herein above can further comprise 3) reacting the lactam-functionalized polymer with at least one compound comprising at least one hydrophobic moiety.

In one aspect, a method for preparing the lactam-functionalized polymers can comprise: 1) reacting a hydroxyl polyether or hydroxyl polyetheramine with a gem-dihalide to form a polymer backbone; 2) reacting the polymer backbone with at least one compound comprising at least one hydrophobic moiety to form a hydrophobically modified polymer; and 3) reacting the hydrophobically modified polymer with at least one compound comprising at least one lactam moiety. The at least one compound comprising the at least one lactam moiety can further comprise at least one reactive functional group.

In another aspect, a method for preparing the lactam-functionalized polymers can comprise: 1) reacting a hydroxyl polyether or hydroxyl polyetheramine with a gem-dihalide to form a polymer backbone; and 2) reacting the polymer backbone with at least one compound comprising at least one hydrophobic moiety and at least one compound comprising at least one lactam moiety. The at least one compound comprising the at least one lactam moiety can further comprise at least one reactive functional group.

The at least one compound comprising the at least one lactam moiety can further comprise at least one reactive functional group is the same as those described previously.

In one non-limiting embodiment, the compound comprising at least one lactam moiety and at least one reactive functional group can be selected from the group consisting of 1-chloro-2-pyrrolidinone, 1-bromo-2-pyrrolidinone, 1-amino-2-pyrrolidinone, 1-hydroxy-2-pyrrolidinone, 1-(hydroxymethyl)-2-pyrrolidinone, 2-oxo-1-pyrrolidinecarboxaldehyde, 1-(chloromethyl)-2-pyrrolidinone, 1-(bromomethyl)-2-pyrrolidinone, 1-(aminomethyl)-2-pyrrolidinone, 1-(2-aminoethyl)-2-pyrrolidinone, 1-(2-hydroxyethyl)-2-pyrrolidinone, 1-(2-chloroethyl)-2-pyrrolidinone, 1-(2-bromoethyl)-2-pyrrolidinone, 1-(3-aminopropyl)-2-pyrrolidinone, 1-(3-hydroxypropyl)-2-pyrrolidinone, 1-(3-chloropropyl)-2-pyrrolidinone, 1-(3-bromopropyl)-2-pyrrolidinone, 1-(3-fluoropropyl)-2-pyrrolidinone, 1-(2-propyn-1-yl)-2-pyrrolidinone, 2-oxo-1-pyrrolidineacetic acid, 1-ethenyl-2-pyrrolidinone, 2-oxo-1-pyrrolidinonecabonitrile, 1-(2-propn-1-yl)-2-pyrrolidinone, and combinations thereof. Further useful examples of compounds comprising at least one lactam moiety may be found in U.S. Pat. Nos. 2,775,599; 3,136,766; 4,801,400; 4,842,858; 5,352,251; 5,458,660; 5,507,843; and 6,261,327, each publication of which is herein incorporated in its entirety by reference.

In another non-limiting embodiment, the compound comprising at least one lactam moiety and at least one reactive functional group can be a compound comprising at least one lactam moiety and at least on cyclic ether moiety. Non-limiting examples of the compounds comprising at least one lactam moiety and at least one cyclic ether moiety can include, but are not limited to N-(2,3-epoxypropyl)pyrrolidinone, N-(3,4-epoxybutyl)pyrrolidinone, N-(4,5-epoxypentyl)pyrrolidinone, N-ethylpyrrolidone glycidyl ether, and the like.

The compounds comprising at least one hydrophobic moiety can be represented by the following general chemical formula:

Y—R—X wherein R is a hydrocarbon, and X is a hydrogen or a reactive functional group selected from the group consisting of hydroxyl, halogen, epoxide, glycidyl ether, amino, sulfhydryl, and combinations thereof. Y is a reactive functional group selected from the group consisting of hydroxyl, halogen, epoxide, glycidyl ether, amino, sulfhydryl, and combinations thereof. The hydrocarbon can be selected from the group consisting of a substituted or unsubstituted alkyl, alkenyl, aryl, alkylaryl, arylalkyl, arylalkenyl, cyclic, cycloaliphatic, and polycyclic, optionally having at least one heteroatom.

In one non-limiting embodiment, the compound comprising at least one hydrophobic moiety can be selected from the group consisting of glycidyl ethers such as ethyl glycidyl ether, butyl glycidyl ether, pentyl glycidyl ether, hexyl glycidyl ether, heptyl glycidyl ether, octyl glycidyl ether, 2-ethylhexyl glycidyl ether, norbornyl glycidyl ether, nonyl glycidyl ether, decyl glycidyl ether, undecyl glycidyl ether, dodecyl glycidyl ether, tridecyl glycidyl ether, tetradecyl glycidyl ether, pendecyl glycidyl ether, hexadecyl glycidyl ether, heptadecyl glycidyl ether, octadecyl glycidyl ether, eicoyl glycidyl ether, lauryl glycidyl ether, stearyl glycidyl ether, 2-butyl-1-octyl glycidyl ether, phenyl glycidyl ether, naphthyl glycidyl ether, cresyl glycidyl ether; halogenated hydrocarbons such as 1-bromobutane, 1-bromopentane, 1-bromohexane, 1-bromoheptane, 1-bromooctane, 1-bromononane, 1-bromodecane, 1-bromoundecane, 1-bromododecane, 1-bromotridecane, 1-bromotetradecane, 1-bromopentadecane, 1-bromohexadecane, 1-1-bromoheptadecane, 1-bromooctadecane, primary amines, secondary amines, tertiary amines, quaternary amines, tertiary phosphines and combinations thereof.

Non-limiting examples of compounds comprising at least one hydrophobic moiety can include ethoxylated nonylphenols such as IGEPAL® CO 890; ethoxylated tallow amines such as Rhodameen® series of compounds; and ethoxylated fatty tertiary amines such as Rhodameen® T-50 and Rhodameen® T-12/90, which are all commercially available from Solvay. More examples can include, but are not limited to, bisphenol-A polyethoxylates available from PPG Industries; DL-3-octadecyloxy-1,2-propanediol; 1-phenyl-1,2-ethane diol; 1H, 1H, 2H, 3H,3H-pentafluoroundecane-1,2-diol; 1,3-dioxane-5,5-dimethanol; 3-fluorobenzal bromide; (dichloromethyl)dimethyl-n-propylsilane; 1-hexadecylamine; 4-fluorobenzene boronic acid; and the like.

The hydroxyl polyether or hydroxyl polyetheramine comprises at least one hydroxyl group. The hydroxyl polyetheramine comprises at least one amino group.

The hydroxyl polyether can be dihydroxyl polyether. In one non-limiting embodiment, the dihydroxyl polyether can be a polyalkylene glycol bearing terminal hydroxyl groups. In another non-limiting embodiment, the dihydroxyl polyether can be a polyethylene glycol (PEG). Non-limiting examples of the PEGs may be found in the ACS Symposium Book titled 'Poly(ethylene glycol) Chemistry and Biological Applications', Editors: J. Milton Harris and Samuel Zalipsky, Volume 680, 1997, the publication of which is herein incorporated in its entirety by reference. PEGs, ranging in weight average molecular weight from about 100 to about 20,000 Daltons, can be obtained from several commercial sources. For example, various grades of low weight average molecular weight polyethylene glycols (molecular weight range of 4,000-8000 Daltons) are commercially available from The Dow Chemical Company under the trademark of Carbowax. In yet another non-limiting embodiment, the alpha, omega-dihydroxy polyether is a poly(ethylene oxide) polymer. Various grades of poly(ethylene oxide) polymers are commercially available from The Dow Chemical Company under the trademark of Polyox.

In one non-limiting embodiment, the polyetheramine can be represented by the following general chemical formula:

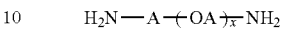

$$H_2N-A-(OA)_x-NH_2$$

wherein x is an integer ranging from 2 to 100 and each A is independently selected from the $C_2$-$C_8$ alkylene moieties. Non-limiting examples of polyetheramines can include Jeffamine® diamines of the E, ED, and EDR series that are commercially available from the Huntsman Corp.

Generally, any gem-dihalide may be used in the process for preparing the polyacetal polyether, polyhemiaminal polyether or polyaminal polyether. Non-limiting examples of gem-dihalides can include dibromomethane, dichloromethane, 1,1-dichlorotoluene ($C_6H_5CHCl_2$), 1,1-dichloroethane ($CH_3CHCl_2$), and 1,1-dibromoethane ($CH_3CHBr_2$).

In one non-limiting embodiment, a lactam-functionalized polyacetal polyether (PAPE) can be prepared as follows. An alkalized PAPE is produced by reacting a dihydroxyl polyether, such as a polyethylene glycol (PEG), with a gem-dihalide, such as dibromomethane. The alkalized PAPE is then reacted with a compound comprising at least one lactam moiety and at least one cyclic ether moiety, such as N-[2-(2-oxiranylmethoxy)ethyl]-2-pyrrolidone (EPGE). Scheme 1 shows the schematic diagram for the preparation of the lactam-functionalized PAPE (EPGE PAPE).

Scheme 1: EPGE PAPE Synthesis

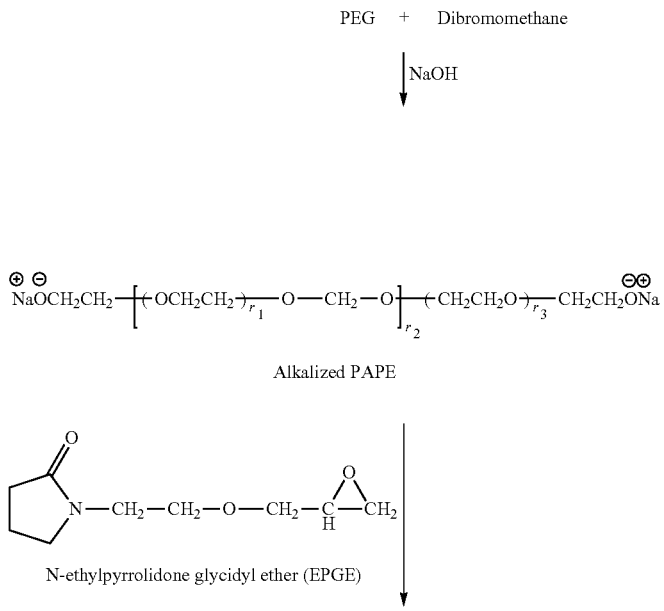

-continued

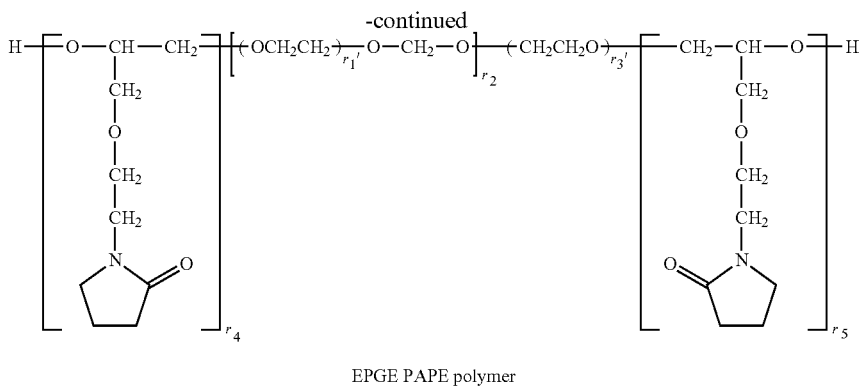

EPGE PAPE polymer where $r_1$ and $r_1'$=1 to 500, $r_2$ and $r_2'$=1-500, $r_3$ and $r_3'$=1 to 500, $r_4$=0 to 500, and $r_5$=0 to 500, with the proviso that at least one of $r_4$ and $r_5$ is non-zero.

The EPGE PAPE shown as above results from the predominant addition reaction at the less hindered face of the epoxide moiety on EPGE, resulting in one or more lactam-functional alkylene moieties A on the polymer backbone as shown in Scheme 2. The epoxide ring opening can also occur by addition reaction at the more hindered face of the epoxide moiety. In such a case, the resulting polymer backbone may comprise one or more lactam-functional alkylene moieties B as shown in Scheme 2.

include toluene, xylene, aliphatic hydrocarbons, dialkyl ethers of alkylene glycols and diethoxymethane.

Any strong base capable of reacting with the terminal active hydrogens of the polyacetal polyether, polyhemiaminal polyether or polyaminal-polyether to form the corresponding dianion, can be used in the process of making the lactam-functionalized polymer. Non-limiting examples of bases can include alkali metal hydrides, alkali metal hydroxides, alkali metal carbonates, and organic bases.

The present disclosure relates to a method of thickening a composition comprising adding the lactam-functionalized polymer described hereinabove into the composition.

Scheme 2: Addition Reactions across Epoxide

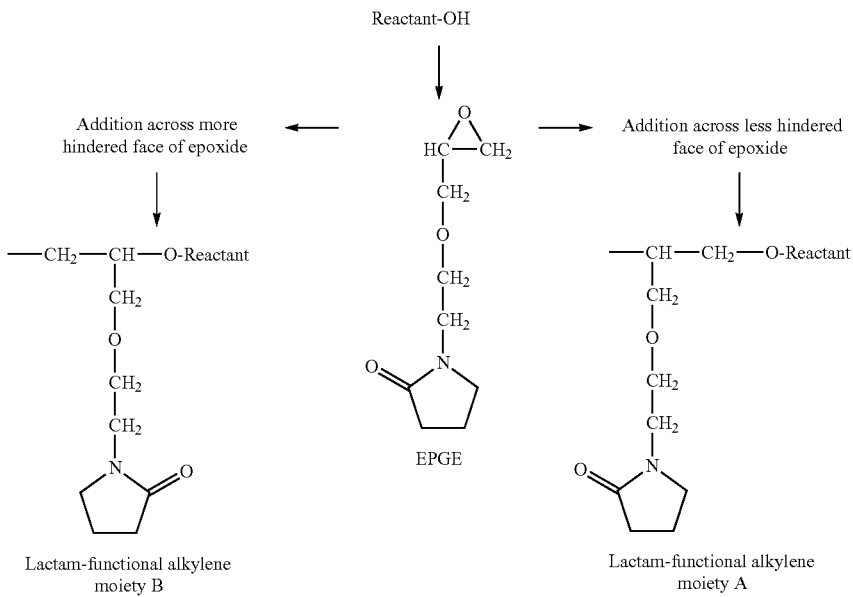

In general, the description of reactions across two faces of an epoxide moiety may be extended to the reaction of any compound comprising at least one epoxide moiety, such as the epoxy-containing compounds listed in this specification, and any nucleophile, such as polyacetal polyethers.

A solvent can be used for the synthesis of the polymers according to the present disclosure. Any solvent without active hydrogens may be used. In one non-limiting embodiment, oxygenated hydrocarbon solvents bearing 2 to 30 carbons can be used. Non-limiting examples of solvents can Examples of the compositions can include, but are not limited to, coating compositions, construction compositions, personal care compositions, oilfield compositions, drilling fluids, drilling muds, cementing fluids, servicing fluids, gravel packing muds, fracturing fluids, completion fluids, workover fluids, spacer fluids, household, industrial and institutional compositions, pharmaceutical compositions, food compositions, biocides, adhesives, inks, papers, polishes, membranes, metal working fluids, plastics, textiles, printing compositions, lubricants, preservatives, agrochemicals, and wood-care compositions.

The present disclosure also relates to a coating composition comprising the lactam-functionalized polymers as described hereinabove. The coating composition may further comprise at least one additive selected from the group consisting of solvents/cosolvents, secondary rheology modifiers, thixotropic agents, binders, crosslinkers, pH adjustment agents, pigments/fillers, flow-control agents, gloss-control agents, coalescent agents, flexibilizing resins, surfactants, waxes, wetting agents, dispersing agents, plasticizers, anti-oxidants, UV radiation absorbers, biocides, extenders, colorants, adhesion promoters, defoaming agents/defoamers, driers, matting agents, and combinations thereof.

Examples of the pigments/fillers can include, but are not limited to, calcium carbonate, mica, barium sulphate, lithopones, zinc oxide, zinc sulphide, titanium dioxide (anatase, rutile), chalk, precipitated calcium carbonate, calcite, dolomites, silicon dioxide, silicic acids, silica flour, pyrogenic silicic acids, precipitated silicic acids, silicates, talc, kaolin, barium sulfates, magnesium silicates, lead, lead oxides, barytes, blanc fixe, sand and glass beads. Special pigments/fillers can include graphene, graphite, carbon nanotubes, carbon, copper, silver, nanosilver, titanium nanotubes, specially decorated inorganic particles and structures, and the like.

Non-limiting examples of the solvents/cosolvents can include aromatic hydrocarbon solvents such as benzene, toluene and xylene, ethyl benzene, isopropyl benzene, alcohols (ethylene glycol monobutyl ether, ethylene glycol monomethyl ether, diethylene glycol mono butyl ether, diethylene glycol monomethyl ether, diethylene glycol monoethyl ether, hexanol, octanol, ethanol, isopropanol, butanol, n-butanol, ethylene glycol, diethylene glycol, ketones (acetone, methyl ethyl ketone, methyl isobutyl ketone, cyclohexanone), diacetone alcohol, dimethyl formamide, n-methyl-2-pyrrolidone, butyrolactone, ethyl acetate, butyl propionate, water, and the like.

Non-limiting examples of the binders can include latex emulsion polymers, which are the polymerization products of one or more ethylenically unsaturated monomers. Examples of ethylenically unsaturated monomers can include, but are not limited to, acrylic acid, acrylonitrile, acetoacetoxy ethyl methacrylate, acetoacetoxy ethyl acrylate, butyl acrylate, butadiene, butyl methacrylate, butyl acrylamide, chloromethyl styrene, crotonic acid, ethyl acrylate, ethyl acrylamide, ethylene, ethyl methacrylate, ethylhexyl acrylate, 2-ethylhexyl acrylate, 2-ethylhexyl methacrylate, glycidyl methacrylate, hydroxyethyl (meth)acrylate, hydroxypropyl (meth)acrylate, isobutyl acrylate, isobutyl methacrylate, isoprene, iso-octyl acrylate, iso-octyl methacrylate itaconic acid, methyl acrylate, octyl acrylate, octyl methacrylate, methyl methacrylate, methacrylic acid, α-methyl styrene, styrene, vinyl chloride vinyl naphthalene, vinyl toluene, vinylidene chloride, vinyl acetate, and the like.

Other binders used in the present disclosure can include, but are not limited to alkyd resins, polyurethane resins, epoxy resins, and the like. Alkyd resins are generally comprised of polybasic acids, polyhydric alcohols, and fatty acids which may be unsaturated. The polybasic acids such as aromatic, aliphatic and alicyclic saturated and unsaturated compounds, such as adipic acid, chlorendic acid, heptanedioic acid, isophthalic acid, maleic acid, napthalic acid, phthalic acid, sebacic acid, succinic acid, trimellitic acid, terephthalic acid, and tetrahydrophthalic acid. Polyhydric alcohol components include 1,3-butylene glycol, diethylene glycol, dipentaerythritol, dipropylene glycol, ethylene glycol, glycerin, 1,6-hexanediol, neopentyl glycol, pentaerythritol, propylene glycol, sorbitol, trimethylol ethane, trimethylol propane and triethylene glycol. Fatty acids used in the manufacture of alkyds commonly include dehydrated castor oil, coconut oil, cottonseed oil, fish oil, linseed oil, oiticica oil, tung oil, safflower oil, soya oil, tall oil acids, and the like.

Polyurethane resins are formed from polyisocyanate (aliphatic, aromatic, or combinations thereof) compounds. Examples of aliphatic isocyanates include butane diisocyanate, 4,4'-diisocyanatodicyclohexylmethane, hexamethylene diisocyanate, hexahydroxylylene diisocyanate, isophorone diisocyanate, 1-methyl-2,4(2,6)-diisocyanato cyclohexane, norbornane diisocyanate, and tetramethylxylylene diisocyanate. Examples of aliphatic and aromatic isocyanates include 4,4'-biphenylene diisocyanate, 4-chloro-1,3-phenylene diisocyanate, 1,4-cyclohexylene diisocyanate, 1,10-deca-ethylene diisocyanate, methylene bis-(4-phenyl isocyanate), 4,4-methylene-bis(cyclohexyl isocyanate), 1,5-naphthalene diisocyanate, 1,3-phenylene diisocyanate, 2,4-tolylene diisocyanate, 2,6-tolylene diisocyanate, 1,4-tetramethylene diisocyanate, 1,5-tetrahydronaphthalene diisocyanate, and the like.

In addition to isocyanates, alcohols and carboxylic acids, which form polyester compositions, can also be used in the preparation of polyurethane resins. The polycarboxylic acids may be of an aliphatic, cycloaliphatic, aromatic and/or heterocyclic nature and may comprise halogen atoms and/or unsaturated moieties. Suitable acids include adipic acid, azeleic acid, bis-glycol terephthalate, dimeric fatty acids, dimethyl terephthalate, endomethylenetetrahydrophthalic anhydride, fumaric acid, glutaric anhydride, hexahydrophthalic anhydride, isophthalic acid, maleic acid, maleic anhydride, phthalic anhydride, phthalic acid, suberic acid, succinic acid, sebacic acid, tetrahydrophthalic anhydride and tetrachlorophthalic anhydride. Polyhydric alcohols examples include 1,4-, 1,3- and 2,3-butylene glycol, cyclohexanedimethanol (1,4-bis-hydroxymethylcyclohexane), diethylene glycol, dipropylene glycol, dibutylene glycol, ethylene glycol, 1,2- and 1,3-propylene glycol, 1,6-hexanediol, 2-methyl-1,3-propanediol, neopentylglycol, 1,8-octanediol, polyethylene glycol, polypropylene glycol, polybutylene glycol, triethylene glycol and tetraethylene glycol. Polyesters comprising carboxyl groups and terminal carboxyl groups are envisioned. Diols comprising carboxyl or carboxylate groups which are suitable to support ionic or potentially ionic groups are envisioned. Such moieties can be constructed by dihydroxysuccinic acid, dimethylolacetic acid, 2,2-dimethylolpropionic acid, 2,2-dimethylolbutyric acid and 2,2-dimethylolpentanoic acid. Polyesters constructed from lactones are also envisioned. Polycarbonates comprising hydroxyl groups are useful and are prepared by reacting diols with dicarbonates such as diphenyl carbonate or phosgene. Polyethers comprising diols, formed from polymers derived from ethylene oxide, propylene oxide and/or tetrahydrofuran are also useful. An amine functionality can be employed to introduce terminal hydroxyl functionality, with compounds such as diethanolamine, ethanolamine, N-methylethanolamine, propanolamine, N,N,N'-tris-2-hydroxyethyl-ethylendiamine.

Epoxy resins are comprised primarily of linear chain molecules. These molecules are formed from the reaction of bisphenols with halohydrins to yield epoxy resins containing epoxy groups. Common bisphenols include bisphenol-A, bisphenol-F, bisphenol-S, and 4,4' dihydroxy bisphenol. Common halohydrins include epichlorohydrin, dichlorohydrin, and 1,2-dichloro-3-hydroxypropane. Examples of commercially available epoxy resins include D.E.R.™ 333 and D.E.R.™ 661 from The Dow Chemical Company; EPON™ 828, EPON™ 836, and EPON™ 1001 from Momentive Specialty Chemicals Inc.; Ciba-Geigy epoxy resins GT-7013, GT-7014, GT-7074, GT-259 from Huntsman; and Ancarez™ AR 555 from Air Products.

Non-limiting examples of the secondary rheology modifiers can include celluloses and cellulose derivatives, guars and guar derivatives, modified ureas, polyurethane thickeners and associative thickeners, alkali swellable emulsions (ASEs), hydrophobically modified alkali swellable emulsions (HASEs), hydrophobically modified polyurethanes (HEURs), hydrophobically modified polyethers (HMPEs), attapulgites, hydrophobically modified polyacetal polyethers (HMPAPEs), acrylate thickeners, amides and organic derivatives, fumed silicas, synthetic layered silicates, organoclays, mixed minerals, thixotropy boosters, polyalkylene ether derivatives, starches, polyacrylates, and the like.

Non-limiting examples of the pH adjustment agents can include monoethanol amine, triethanol amine, methylaminoethanol, 2-amino-2-methyl-1-propanol, 2-(n-butylamino) ethanol, ammonium hydroxide, ammonia, caustic, potassium hydroxide, formic acid, acetic acid, citric acid, organic acids, minerals acids, hydrochloric acid, sulfuric acid, nitric acid, phosphoric acid, and the like.

Non-limiting examples of biocidal agents can include 2-n-octyl-3-isothiazolone, chlorothalonil, carbendazim, diuron, isothiazolone, 2-octyl-2H-isothiazol-3-one (OIT), iodopropynyl butyl carbamate (IPBC), sodium 2-pyridinethiol-1-oxide, zinc 2-pyridinethiol-1-oxide, 1,2-dibromo-2,4-dicyanobutane, 2-(4-thiazolyl)-benzimidazole, thiabendazole, tebuconazole, methylene bis(thiocyanate), 2-(thiocyano-methylthio)-benzothiazole, octhilinone, barium metaborate, propiconazole, diiodomethyl p-tolyl sulfone, 3-iodo-2-propynyl butyl carbamate, n-(trichloromethylthio) phthalimide, tributyltin benzoate, alkyl amine hydrochlorides, n-trichloromethylthio-4-cyclohexene-1,2-dicarboximide, 2-methylthio-4-tert-butyl -amino-6-cyclopropylamino-s-triazine, tetrachloroisophthalonitrile, zinc dimethyldithiocarbamate, zinc 2-mercaptobenzothiazole, trans-1,2-bis(n-propyl-sulfonyl ethane, 4,5-dichloro-2-n-octyl-3-(2H)-isothiazolone, 4,5-dichloro-2-octyl-4-isothiazolin-3-one (DCOIT), carbendazim, Irgarol, 10,10'-oxybisphenoxarsine, triclosan, 2-methylthio-4-tert-butyl-amino-6-cyclopropylamino-s-triazine, n-cyclopropyl-N'-(1,1-dimethylethyl)-6-)methylthio)-1,3,5-triazine-2,4-diamine, zinc dimethyldithiocarbamate (Ziram), Irgarol® 1051 (commercially available from BASF SE), tributyltin oxide (TBTO), 5-chloro-methyl-2H-isothiazol-3-one/2-methyl-2H-isothiazol-3-one (CIT/MIT), benzisothiazolinone (BIT), methylisothiazolinone (MIT), hexahydro-1,3,5-tris(2-hydroxyethyl)-S-triazine, sodium pyrithione, zinc 2-pyridinethiol-1-oxide, 1,2-benzoisothiazolin-3-one, glutaraldehyde, 2,2-dibromo-3-nitrilopropionamide (DBNPA), poly (hexamethylenebiguanide) hydrochloride (PHMB), 2-bromo-2-nitropropane-1,3-diol (Bronopol), 1,2-dibromo-2-4-dicyanobutane, 1-bromo-1-(bromomethyl)-1,3-propanedicarbonitrile, 2,2-dibromo-3-nitrio-propionamide, benzyl bromoacetate, 1-bromo-1-(bromomethyl)-1,3-propanedicarbonitrile, Dazomet, dodecylguanidine hydrochloride, methylene dithiocyanate, 1-methyl-3,5,7-triaza-1-azoniaadamantane chloride, 2-bromo-4'-hydroxyacetophenone, dibromo-3-nitrilopropionamide, 1,2-benzisothiazolin-3-one, hexahydrotriazine, bromo-beta-nitrostyrene, ethyldihydro-1H,3H,5H-oxazolo(3,4-C)oxazole, acetoxy-2,4-dimethyl-m-dioxane, nitrobutyl morpholine, ethyl-2-nitrotrimethylene dimorpholine, sodium o-phenylphenate, chloroallyl-3,5,7-azoniaadamantane chloride, sodium salt of biphenylol, tributyltin benzoate, alkylamine hydrochlorides, mixture of monocyclic oxazolidines, n-methyl-2-hydroxymethyleneoxypropyl-2'-hydroxypropylamine, sodium hydroxymethyl glycinate, mixture of bicyclic oxazolidines, 1,3-bis(hydroxymethyl)-5,5-dimethyl hydantoin, hydroxymethyl 5,5-dimethylhydantoin, 5-chloro-2-methyl-4-isothiazolin-3-one, 2-methyl-4-isothiazolin-3-one, 2-methyl-4-isothiazolin-3-one, and combinations.

Non-limiting examples of colorants can include pigments and/or dyes. Suitable pigment materials can be found in Hunger's "Industrial Organic Pigments," Itoh's "Dictionary of Pigments," and Leach and Pierce's "Printing Ink Manual." Examples of inorganic pigments can include, but are not limited to, pigment blacks (lamp, furnace, channel blacks), iron oxides (red, yellow, brown, black, transparent, etc.), spinel black, chromium oxides green, chromate yellows, iron blues, zinc chromate, molybdate orange, molybdate reds, ultramarine, cadmium, mixed phase pigments (nickel titanium yellow, chromium titanium yellow, cobalt green, cobalt blue, zinc iron brown, iron manganese black), all types of metallic powder pigments such as aluminum powder, gold powder, silver powder, copper powder, bronze powder, and brass powder; or their metal flake pigments; mica flake pigment; mica flake pigments which have been coated with metallic oxides; mica shape oxide pigments, and the like.

Organic pigments can include, but are not limited to, monoazo pigments (acetoacetarylide, benzimidazolone, naphthol AS, pigmented b-naphthol dyes), disazo pigments (azo condensation pigments, dipyrazolone), polycyclic pigments (quinacridone, dioxazine, perylene, diketopyrrolopyrrole, isoindoline), and metal complex pigments (Cu-phthalocyanines). Examples of the dyes can include metal complex dyes, anionic dyes, azo dyes, and the like.

Cellulose derivatives can include, but are not limited to, ethyl cellulose (EC), hydroxyethyl cellulose (HEC), hydroxypropyl cellulose (HPC), ethylhydroxyethyl cellulose (EHEC), carboxymethyl cellulose (CMC), carboxymethylhydroxyethyl cellulose (CMHEC), hydroxypropylhydroxyethyl cellulose (HMHEC), methyl cellulose (MC), methylhydroxypropyl cellulose (MHPC), methylhydroxyethyl cellulose (MHEC), carboxymethylmethyl cellulose (CMMC), hydrophobically modified carboxymethyl cellulose (HMCMC), hydrophobically modified hydroxyethyl cellulose (HMHEC), hydrophobically modified hydroxylpropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmothyl cellulose (HMCMMC), cationic hydroxyethyl cellulose (cationic HEC), cationic hydrophobically modified hydroxyethyl cellulose (cationic HMHEC), nano fibrillated cellulosics (NFC), and microfibrillated cellulosics (MFC).

Guar derivatives can include, but are not limited to, carboxymethyl guar, carboxymethylhydroxypropyl guar, cationic hydroxypropyl guar, hydroxyalkyl guar such as hydroxyethyl guar, hydroxypropyl guar, and hydroxybutyl guar, carboxylalkyl guars such as carboxymethyl guar, carboxylpropyl guar, carboxybutyl guar, and the like.

Examples of the defoaming agents or defoamers can include, but are not limited to, silicone defoamers, silicone defoamers comprising polysiloxane and hydrophobic particles, silicone-free defoamers comprising hydrophobic particles and polymers, silicone-free defoamers comprising polymers, mineral oil defoamers comprised of paraffin based mineral oil, hydrophobic particles, and polysiloxanes.

Surfactants can provide excellent surface tension reducing capabilities for substrate wetting. Surfactants used in the present disclosure can be nonionic and anionic surfactants.

Examples of the nonionic surfactants can include, but are not limited to, $C_{12}$-$C_{18}$ fatty alcohol ethoxylates, $C_{12}$-$C_{14}$ fatty alcohol ethoxylates, $C_{16}$-$C_{18}$ fatty alcohol ethoxylates, $C_{13}$-$C_{15}$ oxo alcohol ethoxylates, $C_{10}$-$C_{18}$ alcohol ethoxylates, $C_{13}$ oxo alcohol ethoxylates, $C_{10}$ Guerbet alcohol ethoxylates, $C_{10}$ Guerbet alcohol alkoxylates, $C_{10}$ oxo alcohol ethoxylates, alkyl polyglucosides (e.g., $C_8$-$C_{10}$ alkyl polyglucoside, $C_8$-$C_{14}$ alkyl polyglucoside, $C_{12}$-$C_{14}$ alkyl polyglucoside, blends of $C_{12}$-$C_{10}$ alkyl polyglucoside on inorganic and organic carrier, amine ethoxylates (e.g., oleyl amine+12 EO, coco amine+~12 EO), aminopolyol (e.g., triethanol amine+18 EO, ethylene diamine+4 PO), alkyl pyrrolidones (e.g., N-octyl pyrrolidone, N-butyl pyrrolidone, N-dodecyl pyrrolidone), resin precursors and additives (e.g., Bisphenol A ethoxylates, BIS A+3 EO, BIS A+4 EO, BIS A+6 EO), emulsifiers and solubilizers (e.g., 4-$C_{10-13}$-sec-alkyl derivatives of benzenesulfonic acid calcium salts, castor oil+~20 EO, castor oil+~35 EO, castor oil+~40 EO, epoxidized vegetable oil, ethoxylated rape seed oil, sorbitanester ethoxylated, decyl alcohol+~3 EO, $C_8$ fatty alcohol+4 EO, fatty alcohol ethoxylate, $C_8$-$C_{10}$ fatty alcohol+~5 EO, $C_{12}$-$C_{14}$ fatty alcohol+~50 EO, ethoxylated sorbitan trioleate, castor oil ethoxylate, phenol ethoxylate, alcohol ethoxylate, ethoxylated mono-/di glyceride), foam suppressors (e.g., polyalkoxyester and solvent, fatty alcohol alkoxylate, carboxylic acid ester, phosphoric acid ester, combination of paraffin and silicon on carrier, alkyl polyalkylene glycol ether, Guerbet alcohol $C_{16}$+~2 EO, fatty alcohol alkoxylate), low-foaming nonionic surfactants (e.g., fatty alcohol alkoxylate, modified fatty alcohol polyglycol ether, amine alkoxylate, end-capped Guerbet alcohol alkoxylate, end-capped fatty alcohol alkoxylate, PO/EO block copolymers), lauramine oxide, cocamidopropylamine oxide, alkylamido propyl betaine, polyglycol ether of an aliphatic diol, oleic acid amide+10 EO, emulsifiable methyl canolate, unsaturated fatty alcohol ethoxylate, fatty alcohol poly glycol ethers, fatty alcohol poly glycol ethers with fatty acid, unsaturated fatty alcohol ethoxylate), polyethylene glycols, polypropylene glycols, methyl polyethylene glycols, alkyl polyalkylene glycol copolymers, alkyl polypropylene glycols, polyfunctional polyalkylene glycols, reactive polyalkylene glycols.

Other nonionic surfactants can include, but are not limited to, alkylphenol ethoxylates such as nonylphenol ethoxylates and octylphenol ethoxylates, secondary alcohol alkoxylates such as secondary alcohol ethoxylates (TERGITOL™15-S-9, commercially available from The Dow Chemistry Company), and primary alcohol alkoxylates.

Examples of anionic surfactants can include, but are not limited to, sodium salt of lauryl ether sulfate+2 EO, sodium salt of iso-tridecyl alcohol ether sulfate+20 EO, sodium salt of fatty alcohol ether sulfate+2 EO, sodium salt of fatty alcohol ether sulfate+4 EO, sodium salt of fatty alcohol ether sulfate+7 EO, sodium salt of fatty alcohol ether sulfate+12 EO, sodium salt of fatty alcohol ether sulfate+30 EO, sodium salt of fatty alcohol ether sulfate+50 EO, sodium salt of $C_{12}$-$C_{14}$ fatty alcohol ether sulfate+1 EO, sodium salt of $C_{12}$-$C_{14}$ fatty alcohol ether sulfate+2 EO, sodium salt of $C_{12}$-$C_{14}$ fatty alcohol ether sulfate+3 EO, ammonium salt of $C_8$-$C_{14}$ fatty alcohol sulfate, sodium salt of 2-ethylhexyl sulfate, sodium salt of $C_{16}$-$C_{18}$ fatty alcohol sulfate, sodium salt of $C_{12}$ fatty alcohol sulfate, sodium salt of $C_{12}$-$C_{14}$ fatty alcohol sulfate, sodium salt of $C_{12}$-$C_{16}$ fatty alcohol sulfate, sodium salt of $C_{12}$-$C_{18}$ fatty alcohol sulfate, sodium salt of $C_{16}$-$C_{18}$ fatty alcohol sulfate, sodium salt of $C_8$ fatty alcohol sulfate, sodium salt of linear $C_{10}$-$C_{13}$ alkyl benzene sulfonate, sodium salt of linear $C_{10}$-$C_{13}$ alkyl benzene sulfonic acid, potassium salt of oleic acid sulfonate.

Other surfactants used in the present disclosure can include, but are not limited to, ester quats, sodium salt of alkyl ether phosphate, sodium-N-lauryl-β-iminodipropionate, acid phosphoric ester of a fatty alcohol ethoxylate+3 EO, sodium salt of mono-alkenyl sulfosuccinamate, sodium salt of mono-alkenyl sulfosuccinate+5 EO, sodium salt of di-isodecyl sulfosuccinate, sodium dioctylsulphosuccinate, acid phosphoric ester, amine salt of dodecylbenzenesulphonate, alkyl ester phosphate, and the like.

Non-limiting examples of coalescent agents can include ethylene glycol monobutyl ether acetates, diethylene glycol monoethyl ether, lower monoalkyl ethers of ethylene or propylene glycol (propylene glycol methyl ether), dimethyl succinate, diethyl succinate, diisopropyl succinate, toluates (e.g., 2-ethoxyethyl p-toluate, 2-propoxyethyl o-toluate, 2-ethoxyethyl o-toluate, 2-ethoxyethyl benzoate, 2-(2-ethoxyethoxy)ethyl p-toluate), benzoates (e.g., 2-(2-ethoxyethoxy)ethyl benzoate, 2-propoxyethyl benzoate, 2-methoxy-1-methylethyl benzoate, 2-(2-methoxy-1-methylethoxy)-1-methylethyl benzoate, 2-propoxy-1-methylethyl benzoate). Levulinic acid ester of 2-hexyl-1-decanol, levulinic acid ester of 1-tetradecanol/2-hexyldecanol, di-octyl succinate, polytrimethylene ether glycol, hexylene glycol, butoxyethyoxypropanol, n-propoxypropanol, n-butoxypropanol, diethylene glycol monobutyl ether acetate, phenyl glycol ether, 2,2,4-trimethylpentanediol-1,3-monoisobutyrate, n-dibutyl glutarate, n-dipentyl glutarate, n-dihexyl glutarate, n-diheptyl glutarate, n-dioctyl glutarate, di-isobutyl glutarate, di-2-methylbutyl glutarate, di-4-methyl-2-pentyl glutarate, di-2-ethylhexyl glutarate, pentylol glutarate, tetrapropylene glycol monobutyl ether, and the like. Mixtures of these compounds are also suitable as coalescing agents.

Coating compositions comprising the lactam-functionalized polymers according to the present disclosure may be applied to a variety of surfaces and substrates. These surfaces and substrates can include, but are not limited to, asphalt, cement, concrete, drywall, glass, masonry, metal, paper, plastic, textile, wall paper, and wood. The coating compositions according to the present disclosure can provide an enhanced hiding power to substrates coated with the compositions.

The polymers and their applications according to the present disclosure may be prepared and used according to the examples set out below. These examples are presented herein for purposes of illustration of the present disclosure and are not intended to be limiting, for example, the preparations of the polymers and their applications.

EXAMPLES

Polymer Preparation

In the examples, the following abbreviations are used:
HPP: N-(3-hydroxylpropyl)-2-pyrrolidone
HEP: N-(2-hydroxyethyl)-2-pyrrolidone
EPGE: N-[2-(2-oxiranylmethoxy)ethyl]-2-pyrrolidone
EHGE: 2-[[2-ethylhexyl)oxy]methyl]-oxirane
PAPE: Polyacetal polyether
PEG1: Polyethylene glycol with approximate $M_n$=7860, $M_w$=8240

PEG2: Polyethylene glycol with approximate $M_n$=8143, $M_w$=8510
PEG3: Polyethylene glycol with approximate $M_n$=3640, $M_w$=3790
NaOH: Sodium hydroxide
DBM: Dibromomethane
C4Br: 1-bromobutane
C8Br: 1-bromooctane
C12Br: 1-bromododecane
C16Br: 1-bromohexadecane
C18Br: 1-bromooctadecane
$M_w$: Weight-average molecular weight
$M_n$: Number-average molecular weight
$M_z$: Z-average molecular weight Example 1

Synthesis of Polymers A and B

A reactor was charged with PEG and NaOH. The temperature was adjusted to Temp1 and the contents of the reactor were stirred for 30 minutes under vacuum of 29 in. Hg. The temperature was maintained at Temp1, water was added, and the contents of the reactor were stirred for 30 minutes. DBM was added and the contents of the reactor were mixed at Temp1 for 60 minutes. The temperature was adjusted to Temp2 and EPGE was added. The temperature was then adjusted to 120° C. The contents of the reactor were stirred for 180 minutes. The contents were discharged and allowed to cool to 20-25° C. to give Polymers A-B. Table 1 lists the reaction conditions and quantities of the reagents for making Polymers A and B.

TABLE 1

| Polymer | PEG Type | PEG (g) | NaOH (g) | Water (g) | DBM (g) | EPGE (g) | Temp1 (° C.) | Temp2 (° C.) |
|---|---|---|---|---|---|---|---|---|
| A | PEG1 | 600 | 18.7 | 1.7 | 6.9 | 39.0 | 80 | 80 |
| B | PEG3 | 1350 | 51.9 | 1.0 | 39.9 | 50.0 | 90 | 90 |

Example 2

Synthesis of Polymers C-I

A reactor was charged with PEG and NaOH. The temperature was adjusted to Temp1 and the contents of the reactor were stirred for 30 minutes under vacuum of 29 in. Hg. The temperature was maintained at Temp1, water was added, and the contents of the reactor were stirred for Time1. DBM was added and the contents of the reactor were mixed at Temp1 for Time2. The temperature was adjusted to Temp2 and EPGE was added. The temperature was adjusted to Temp3 and the contents of the reactor were stirred at Temp3 for Time3. The temperature was adjusted to Temp4 and alkyl bromide (C4-C18 Br) was added. The temperature was then adjusted to Temp5 and the contents of the reactor were mixed for Time4. A described polymer was obtained except for Polymers D and E. For Polymers D and E, the contents of the reactor were placed under vacuum at 90° C. for 50 minutes. The contents were discharged and allowed to cool to 20-25° C. to give polymers C-H. Table 2 lists the reaction conditions and Table 3 lists the quantities of the reagents for making Polymers C-I.

TABLE 2

| Polymer | Temp1 (° C.) | Temp2 (° C.) | Temp3 (° C.) | Temp4 (° C.) | Temp5 (° C.) | Time1 (min) | Time2 (min) | Time3 (min) | Time4 (min) |
|---|---|---|---|---|---|---|---|---|---|
| C | 80 | 80 | 90 | 90 | 110 | 30 | 60 | 60 | 120 |
| D | 80 | 80 | 100 | 100 | 120 | 20 | 50 | 45 | 90 |
| E | 80 | 80 | 100 | 100 | 120 | 20 | 50 | 45 | 90 |
| F | 80 | 80 | 100 | 100 | 120 | 30 | 60 | 60 | 90 |
| G | 90 | 120 | 120 | 120 | 120 | 30 | 60 | 15 | 180 |
| H | 80 | 80 | 100 | 100 | 120 | 30 | 60 | 60 | 90 |
| I | 80 | 80 | 100 | 100 | 120 | 30 | 60 | 60 | 90 |

TABLE 3

| Polymer | PEG Type | PEG (g) | NaOH (g) | Water (g) | DBM (g) | EPGE (g) | C4 Br (g) | C8 Br (g) | C12 Br (g) | C16 Br (g) | C18 Br (g) |
|---|---|---|---|---|---|---|---|---|---|---|---|
| C | PEG3 | 1350 | 51.9 | 1.0 | 30.4 | 150.0 | 127.0 | — | — | — | — |
| D | PEG3 | 1350 | 66.7 | 1.0 | 30.4 | 150.0 | — | 162.5 | — | — | — |
| E | PEG3 | 1350 | 66.7 | 1.0 | 30.4 | 90.0 | — | 162.5 | — | — | — |
| F | PEG3 | 1080 | 59.4 | 1.6 | 24.3 | 115.2 | — | — | 74.0 | — | — |
| G | PEG1 | 600 | 18.7 | 1.7 | 8.0 | 42.9 | — | — | 47.0 | — | — |
| H | PEG1 | 600 | 14.0 | 0.4 | 9.1 | 31.6 | — | — | — | 53.0 | — |
| I | PEG1 | 600 | 14.0 | 0.4 | 9.1 | 43.4 | — | — | — | — | 57.7 |

Example 3

Synthesis of Polymer J

A reactor was charged with 1350 g PEG2 and 33.2 g NaOH. The temperature was adjusted to 90° C. and the contents of the reactor were stirred for 30 minutes under vacuum of 29 in. Hg. The temperature was maintained at 90° C., 0.9 g of water was added, and the contents of the reactor were stirred for 30 minutes. 7.3 g DBM was added and the contents of the reactor were mixed at 90° C. for 60 minutes. The temperature was adjusted to 130° C. and 31.0 g EHGE was added over 60 minutes. The contents of the reactor were stirred at 130° C. for 120 minutes. The temperature was adjusted to 100° C. and 84.8 g EPGE was added. The temperature was then adjusted to 100° C. and the contents of the reactor were mixed for 60 minutes. The contents were discharged and allowed to cool to 20-25° C. to give Polymer J.

TABLE 4

| Polymer | PEG Type | PEG (g) | NaOH (g) | Water (g) | 1st DBM (g) | 2nd DBM (g) | Temp1 (° C.) | Time1 (min) |
|---|---|---|---|---|---|---|---|---|
| K | PEG1 | 544 | 21.8 | 0.8 | 5.3 | 27.5 | 80 | 30 |
| L | PEG1 | 544 | 21.8 | 0.8 | 5.3 | 16.0 | 80 | 30 |
| M | PEG1 | 1089 | 43.6 | 1.5 | 10.5 | 69.7 | 120 | 15 |

Example 4

Synthesis of Polymers K-M

A reactor was charged with PEG and NaOH. The temperature was adjusted to 80° C. and the contents of the reactor were stirred for 30 minutes under vacuum of 29 in. Hg. The temperature was maintained at 80° C., water was added, and the contents of the reactor were stirred for 30 minutes. A first charge of DBM was added and the contents of the reactor were mixed at 80° C. for 60 minutes. The temperature was maintained at 80° C. 15.9 g HPP was added and the contents of the reactor were mixed for Time1. Then a second charge of DBM was added. The contents of the reactor were stirred at 80° C. for 60 minutes. The temperature was adjusted to Temp1. The contents were discharged and allowed to cool to 20-25° C. to give polymers K-M. Table 4 lists the reaction conditions and the quantities of the reagents for making Polymers K-M.

Example 5

Synthesis of Polymer N

A reactor was charged with 1089 g PEG1 and 43.6 g NaOH. The temperature was adjusted to 80° C. and the contents of the reactor were stirred for 30 minutes under vacuum. The temperature was maintained at 80° C., 15.9 g HPP was added, and the contents of the reactor were stirred for 15 minutes. The temperature was maintained at 80° C. and 69.7 g DBM was added. The contents of the reactor were stirred for 60 minutes. The temperature was adjusted to 120° C. The contents were discharged and allowed to cool to ambient temperature to give Polymer N.

Example 6

Synthesis of Polymer O

A reactor was charged with 1350 g PEG3 and 66.7 g NaOH. The temperature was adjusted to 90° C. and the contents of the reactor were stirred for 30 minutes under vacuum of 29 in. Hg. The temperature was maintained at 90° C., 1.0 g of water was added, and the contents of the reactor were stirred for 20 minutes. 30.4 g DBM was added and the contents of the reactor were mixed at 90° C. for 50 minutes. 107.5 g C8Br was added. The temperature was adjusted to 120° C. and the contents of the reactor were stirred for 90 minutes. The temperature was adjusted to 100° C. and 150.0 g EPGE was added. The contents of the reactor were mixed for 45 minutes at 100° C. The contents of the reactor were then stirred for 50 minutes at 100° C. under vacuum of 29 in. Hg. The contents were discharged and allowed to cool to 20-25° C. to give Polymer O.

Example 7

Synthesis of Polymers P

A reactor was charged with 1350 g PEG2 and 50.0 g NaOH. The temperature was adjusted to 90° C. and the contents of the reactor were stirred for 30 minutes under vacuum of 29 in. Hg. The temperature was maintained at 90° C., 2.1 g of water was added, 80.0 g HEP was added, and the contents of the reactor were stirred at 90° C. for 60 minutes. The temperature was maintained at 90° C. and 49.8 g DBM was added. The contents of the reactor were stirred at 90° C. for 90 minutes. The contents of the reactor were discharged and allowed to cool to 20-25° C. to give Prophetic Polymers P.

Example 8

Synthesis of Polymer Q-T

A reactor was charged with PEG3 and NaOH. The temperature was adjusted to 90° C. and the contents of the reactor were stirred under vacuum of 29 in. Hg. The temperature was maintained at 90° C., water and HEP were added, and the contents of the reactor were stirred at 90° C. for 60 minutes. The temperature was maintained at 90° C. and DBM was added. The contents of the reactor were stirred at 90° C. for 90 minutes. A described polymer was obtained for Polymer R. For Polymers Q, S and T, the contents of the reactor were placed under vacuum at 90° C. for 60 minutes. The contents of the reactor were discharged and allowed to cool to 20-25° C. to give Prophetic Polymers Q-T. Table 5 lists the reaction conditions and the quantities of the reagents for making Polymers Q-T.

TABLE 5

| Polymer | PEG Type | PEG (g) | NaOH (g) | Water (g) | DBM (g) | HEP (g) |
|---|---|---|---|---|---|---|
| Q | PEG3 | 1350.0 | 133.5 | 4.7 | 173.8 | 64.5 |
| R | PEG3 | 1350.0 | 111.8 | 4.7 | 133.0 | 40.0 |
| S | PEG3 | 1350.0 | 111.8 | 4.7 | 173.8 | 96.7 |
| T | PEG3 | 1350.0 | 133.5 | 4.7 | 173.8 | 80.0 |

A reactor was charged with PEG3 and NaOH. The temperature was adjusted to 90° C. and the contents of the reactor were stirred under vacuum of 29 in. Hg. The temperature was maintained at 90° C., water was added, HEP was added, and the contents of the reactor were stirred at 90° C. for 60 minutes. The temperature was maintained at 90° C. and DBM was added. The contents of the reactor were stirred at 90° C. for 90 minutes. A described polymer was obtained for polymer R. For polymers Q, S, and T the contents of the reactor were placed under vacuum at 90° C. for 60 minutes. The contents of the reactor were discharged and allowed to cool to 20-25° C. to give Polymers Q-T.
Characterization of Polymers
Polymer Purification To a reactor were charged the prepared polymer (50.0 g) and toluene (1.0 L). The reactor was purged with nitrogen and the contents of the reactor were stirred for 45 minutes at 80° C. The reactor was cooled to 25° C. Hexane (1.0-1.5 L) was added and the resultant mixture was stirred for 30 minutes at 25° C. The mixture was filtered through a sintered glass filter funnel while the solid and hexane wet cake was stirred with a spatula. The reactor was rinsed with additional hexane (2×1.0 L). The rinsed mixture was filtered through the sintered glass filter funnel while the solid and hexane wet cake was stirred with a spatula. The collected solid was dried at 20-25° C. for 15 hours followed by drying at 80° C. under vacuum of 29 in. Hg until constant weight was achieved to provide a purified polymer.

NMR Analysis

Sample Preparation—Approximately 1.0 mg of tetrachloro nitrobenzene (TCNB) and approximately 5.0 mg of polymer sample were weighed into a 1.0 mL vial. 0.7 gm of $CDCl_3$ was added into the vial. The vial was loaded into a shaker and the shaker was operated for 30 minutes. The resultant solution was transferred into a 5 mm NMR tube for analysis.

NMR Measurement—Quantitative $^1H$ NMR spectrum was recorded using Bruker 400 MHz NMR spectrometer. Measurement parameters were as follows: temperature 300K, sweep width 20 ppm, pulse width 45 deg, number of scans 32, and relaxation delay 25 s. Processing parameters were as follows: line broadening 0.3 Hz. Spectrum was phase and baseline was corrected using standard practice. Down-field signal of residual $CHCl_3$ from solvent $CDCl_3$ was referenced to 7.24 ppm.

Quantitative NMR Calculation—EPGE weight % was calculated from the —$CH_2$ peaks of pyrrolidone ring (δ 2.42 ppm-2.25 ppm). The weight % of hydrophobe was calculated from the —$CH_2$ proton that was β from the ether oxygen (—$O$-$CH_2$—$CH_2$—$(CH_2)_n$—$CH_3$, δ 1.61-1.47 ppm). The calculation was conducted based on the quantitative NMR procedure, which is described in the following references: Peterson, J. *$^1H$ NMR analysis of mixtures using internal standards: A quantitative experiment for the instrumental analysis laboratory*, J. Chem. Educ., 1992, 69, 843-845; and Bharti, S. K. and Roy, R. *Quantitative $^1H$ NMR spectroscopy*, Trends in Analytical Chemistry, 2012, 35, 5-26 each publication of which is herein incorporated in its entirety by reference.

Size Exclusion Chromatography (SEC) Measurement

SEC was used for measuring polymer molecular weight distributions. Alliance™ HPLC System and Empower™ Chromatography Data System, commercially available from the Waters Corporation (Milford, Mass.) were used to measure the molecular weights. As used herein with respect to polymers, the terms molecular weight, average molecular weight, mean molecular weight, and apparent molecular weight refer to the arithmetic mean of the molecular weight of individual macromolecules as measured by SEC. The relative molecular weight averages from the SEC were calculated versus poly(ethylene glycol/ethylene oxide) (PEG/PEO) standards with narrow molecular weight distribution.

Apparatus Set-Up—All Waters modules in the set-up included:
Waters M515 solvent delivery system
Waters M2707 autosampler
Waters M2414 differential refractive index detector (DRI) for the relative SEC
Column bank(s)—see the details in the "Analysis Conditions" section below.
Waters Empower™ 3 software
RI range 1.00 to 1.75 RIU
Measurement range $7 \times 10^{-7}$ RIU
Drift—$2 \times 10^{-7}$ RIU Analysis Conditions for SEC was described as follows:
Mobile Phase—70% Methanol/30% 0.6M Lithium acetate (pH 4.8) (w/w)
Flow Rate—1.0 ml/mi
Columns—2 Shodex KW-804 Protein columns (8 mm×300 mm)+2 Shodex KW-803 Protein columns (8 mm×300 mm) in series (Showa Denko America, Inc., 420 Lexington Avenue, Suite 2335A, New York, N.Y. 10170, USA)
Column Temperature—40° C.
DRI (differential refractive index) Detector Temperature—40° C.
Calibration—PEO/PEG standards with narrow molecular weight distribution (PSS-USA, Inc. Amherst Fields Research Park, 160 Old Farm Road, Amherst, Mass. 01002)
Sample Concentration—Typically 1.5 mg/ml (unless otherwise noted)—dissolved directly into mobile phase
Injection volume—200 μl
Viscosity of polymer solutions was measured using Brookfield Viscometer with LV spindles 62, 63 or 64 at 30 rpm and 25° C. Table 6 lists the analytical data of Polymers A-T.

TABLE 6

| | NMR | | | | | SEC** | | | Polymer Solution | |
| | | | | | | | | | Polymer Concentration | Brookfield |
| Polymer | Treatment for NMR* | Hydrophobe | Hydrophobe % | Lactam Moiety | Lactam Moiety, % | Mn | Mw | Mz | wt % | Viscosity mPa·s |
|---|---|---|---|---|---|---|---|---|---|---|
| A | Purified | — | — | EPGE | 2.49 | 16200 | 26600 | 40400 | 35.0 | 652 |
| B | Purified | — | — | EPGE | 1.35 | 10500 | 17500 | 26000 | 35.0 | 237 |
| C | Purified | n-butyl | 1.27 | EPGE | 8.20 | 7860 | 11300 | 15600 | 35.0 | 94 |
| D | Purified | n-octyl | 2.37 | EPGE | 7.84 | 8200 | 12000 | 17000 | 35.0 | 203 |
| E | Purified | n-octyl | 2.49 | EPGE | 5.09 | 8000 | 11300 | 16800 | 35.0 | 194 |
| F | Purified | n-dodecyl | 2.24 | EPGE | 6.21 | 8050 | 11800 | 16600 | 42.0 | 2220 |
| G | Purified | n-dodecyl | 1.60 | EPGE | 3.80 | 19300 | 31200 | 46300 | 22.0 | 2440 |
| H | Purified | n-hexadecyl | 1.88 | EPGE | 3.41 | 23000 | 39400 | 60600 | 20.0 | 2945*** |
| I | Purified | n-hexadecyl | 2.32 | EPGE | 4.47 | 24900 | 41400 | 61800 | 20.0 | 8680*** |
| J | Purified | 2-ethylhexyl | 2.06 | EPGE | 4.08 | 11400 | 14200 | 18200 | 35.0 | 361 |
| K | Purified | — | — | PP | 0.38 | 26200 | 48000 | 71500 | 35.0 | 3320 |
| L | Unpurified | — | — | PP | 0.88 | 27700 | 48600 | 72100 | 35.0 | 3330 |
| M | Unpurified | — | — | PP | 1.12 | 37600 | 65900 | 94000 | 35.0 | 8900 |
| N | Unpurified | — | — | PP | 0.69 | 30100 | 54500 | 80400 | 35.0 | 5080 |
| O | Purified | n-octyl | 2.48 | EPGE | 5.27 | 7010 | 10900 | 15700 | 35.0 | 167 |
| P | Purified | — | — | EP | 1.06 | 10300 | 12300 | 15300 | 35.0 | 111 |
| Q | Unpurified | — | — | EP | 1.50 | 11000 | 18200 | 26200 | 35.0 | 186 |

TABLE 6-continued

| | NMR | | | | | Polymer Solution | | | |
|---|---|---|---|---|---|---|---|---|---|
| | Treatment for | | | Lactam | Lactam | SEC** | | Polymer Concentration | Brookfield |
| Polymer | NMR* | Hydrophobe | Hydrophobe % | Moiety | Moiety, % | Mn | Mw | Mz | wt % | Viscosity mPa · s |
| R | Purified | — | — | EP | 1.45 | 14200 | 24700 | 36200 | 35.0 | 367 |
| S | Unpurified | — | — | EP | 1.88 | 8600 | 13300 | 18600 | 35.0 | 103 |
| T | Unpurified | — | — | EP | 1.77 | 9690 | 15600 | 22200 | 35.0 | 136 |

*The purification was conducted according to the procedure described in "Characterization of Polymers
**SEC measurement was conducted on the unpurified samples.
***1.5 wt % methyl beta cyclodextrin was used as a viscosity suppressant Coating Applications Comparative Example A generic semi-gloss formulation was prepared by mixing the grind and control letdown formulations as shown in Table 7A and Table 7B. This formulation was used as a comparative standard.

Example 9

Semi-gloss Formulation

The semi-gloss formulation was prepared by mixing Polymer F and Polymer G prepared in Example 2 with the grind and letdown formulations in Table 7A and Table 7C.

TABLE 7A

Grind Formulation

| | | Amount | |
|---|---|---|---|
| Ingredient | Generic Name/Trade Name | Lbs | Gal |
| 1 | Water | 71.1 | 8.54 |
| 2 | Nuosept ™ 498G | 2.00 | 0.21 |
| 3 | Ammonium Hydroxide (28%) | 1.50 | 0.17 |
| 4 | Tamol ™ 731A | 10.00 | 1.09 |
| 5 | Dextrol ™ OC-180 HS | 4.00 | 0.43 |
| 6 | Drewplus ™ T-4304 | 3.00 | 0.38 |
| 7 | Strodex ™ PK-95G | 2.00 | 0.22 |
| 8 | Ti-Pure ™ R-706 | 280.00 | 8.41 |
| 9 | Minex ® 7 | 30.00 | 1.38 |
| 10 | Min-U-gel ® 400 | 2.00 | 0.07 |

Nuosept ™ 498G: 1,2-benzisothiazolin-3-one, commercially available from Ashland Inc.
Tamol ™ 731A: Sodium salt of a maleic anhydride copolymer, commercially available from The Dow Chemical Company.
Dextrol ™ OC-180 HS: Neutralized (potassium salt) form of an ethoxylated aliphatic alcohol phosphate ester, commercially available from Ashland Inc.
Drewplus ™ T-4304: A defoamer, commercially available from Ashland Inc.
Strodex ™ PK-95G: Neutralized (potassium salt) form of a phosphate coester of aliphatic alcohols, commercially available from Ashland Inc.
Ti-Pure ™ R-706: Titanium dioxide, commercially available from Chemours Titanium Technologies.
Minex ® 7: Micronized functional filler having a median particle size of 3.5 microns, commercially available from The Cary Company.
Min-U-gel ® 400: A hydrous magnesium aluminum silicate, commercially available from Active Minerals International, LLC.

TABLE 7B

Control Letdown Formulation

| | | Amount | |
|---|---|---|---|
| Ingredient | Generic Name/Trade Name | Lbs | Gal |
| 1 | Rhoplex ™ VSR-1050 | 640.00 | 72.40 |
| 2 | Optifilm ™ Enhancer 400 | 8.00 | 0.99 |
| 3 | Drewplus ™ T-4304 | 2.00 | 0.25 |

TABLE 7B-continued

Control Letdown Formulation

| | | Amount | |
|---|---|---|---|
| Ingredient | Generic Name/Trade Name | Lbs | Gal |
| 4 | Polyphase ® 678 | 3.00 | 0.32 |
| 5 | Water | 31.08 | 3.73 |
| 6 | Aquaflow ™ NHS-310 | 12.12 | 1.40 |
| 7 | Aquaflow ™ XLS-530 | 0.80 | 0.09 |

Rhoplex ™ VSR-1050: Acrylic emulsion, commercially available from The Dow Chemical Company.
Optifilm ™ Enhancer 400: a coalescent, commercially available from Eastman Chemical Company.
Polyphase ® 678: a fungicide, commercially available from Troy Corporation.
Aquaflow ™ NHS-310: a solvent-free, nonionic synthetic associative thickener for high shear viscosity, commercially available from Ashland Inc.
Aquaflow ™ XLS-530: a solvent-free, nonionic synthetic associative thickener, commercially available from Ashland Inc.

TABLE 7C

Letdown Formulation

| | | Amount | |
|---|---|---|---|
| Ingredient | Generic Name/Trade Name | Lbs | Gal |
| 1 | Rhoplex ™ VSR-1050 | 640.00 | 72.40 |
| 2 | Optifilm ™ Enhancer 400 | 8.00 | 0.99 |
| 3 | Drewplus ™ T-4304 | 2.00 | 0.25 |
| 4 | Polyphase ® 678 | 3.00 | 0.31 |
| 5 | Water | 31.20 | 3.75 |
| 6 | Polymer F | 10.20 | 1.18 |
| 7 | Polymer G | 2.60 | 0.30 |

Rhoplex ™ VSR-1050: Acrylic emulsion, commercially available from The Dow Chemical Company.
Optifilm ™ Enhancer 400: a coalescent, commercially available from Eastman Chemical Company.
Polyphase ® 678: a fungicide, commercially available from Troy Corporation.

Performance of Coatings

Consistency of coating compositions was evaluated by measuring the Krebs Unit (KU) viscosity using a Stormer-Type Viscometer as per the standard test method ASTM D562. High-shear (ICI) viscosity of compositions was evaluated using a Cone/Plate Viscometer as per the standard test method ASTM D4287. Sag was measured based on the standard ASTM D4400 Method. Levelling was measured based on the standard ASTM D4062 Method.

Applied hide was evaluated by the following general method: The paint formulations prepared in Comparative Example and Example 9 were stirred for approximately 5-10 times. Next, approximately 300-400 g of the paint formulation was poured into a standard 11-inch paint tray. A 7 inch or 9-inch roller was then rolled into the tray for wetting out and conditioning the roller cover. The roller was then primed on a scrap piece of drywall with 5 full vertical strokes. The roller was then returned to the tray and rolled another 3-5 times. The tray containing the roller was then placed on a balance and zeroed. Paint was then applied to a CU-1M chart in a uniform manner until the CU-1M chart was appropriately covered. The roller was then placed back into the tray and the amount of paint applied was recorded. Paints were reapplied if the final spread rates of the paints to be compared were not within 50 sq. ft. of each other. The CU-1M charts were dried for 24 hours at 25° C. CU-1M charts were then evaluated visually for the applied hide with 10 equaling the best and 1 equaling the worst. The results are listed in Table 8.

The data shows different sag, leveling characteristics, and applied hide of paints formulated to similar KU and ICI viscosity values. It is evident that the formulation comprising the polymers of the present disclosure performs better than the comparative standard.

TABLE 8

| Formulation | KU Viscosity | ICI Viscosity | Low Shear Thickening Efficiency | High Shear Thickening Efficiency | Leneta Sag Resistance Rating 4-24 (*= no drip) | Leneta Leveling Rating 1-9 (9 = best) | Applied Hide on CU-1M Chart (Rating 1-10; 1 = worst, 10 = best) |
|---|---|---|---|---|---|---|---|
| Comparative Example | 102 | 1.38 | 0.01 | 0.22 | 18* | 8 | 7 |
| Example 9 | 100 | 1.47 | 0.05 | 0.20 | 12* | 9 | 10 |

Thickening efficiency = [[Weight of Polymer (g)] × [100]]/[Weight Final Paint (g)]

What is claimed is:

1. A lactam-functionalized polymer comprising:
a polymer backbone and at least one lactam-containing moiety attached to the polymer backbone or pendant on the polymer backbone, wherein the polymer backbone is selected from the group consisting of polyacetal polyether, polyhemiaminal polyether, polyaminal polyether, and combinations thereof.

2. The lactam-functionalized polymer of claim 1, wherein the at least one lactam-containing moiety is attached to at least one end of the polymer backbone.

3. The lactam-functionalized polymer of claim 2, wherein the at least one lactam-containing moiety has a general formula (I):

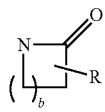

(I)

wherein R is a substituted or unsubstituted hydrocarbon diradical optionally having at least one heteroatom and is attached to a carbon or nitrogen atom on the lactam ring, and b is from 1 to 5.

4. The lactam-functionalized polymer of claim 3, wherein R is selected from the group consisting of a substituted or unsubstituted alkylene, alkenyl, aryl, alkylaryl, arylalkylene, arylalkenyl, cyclic, cycloaliphatic and polycyclic, optionally having at least one heteroatom.

5. The lactam-functionalized polymer of claim 4, wherein R is an alkylene having 1 to 30 carbon atoms, optionally having at least one heteroatom.

6. The lactam-functionalized polymer of claim 3, wherein the at least one lactam-containing moiety has one or both of the following general formulas:

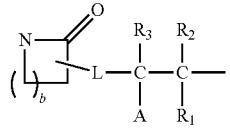

Formula (III)

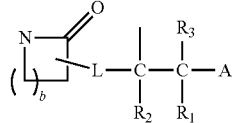

Formula (IV)

wherein L is a direct bond, or a substituted or unsubstituted alkylene optionally having at least one heteroatom; A is hydrogen, $OX_nH$, $SX_nH$, or $NR_4X_nH$; $R_1$- $R_4$ are identical or different and are each independently hydrogen, linear or branched alkyl having 1 to 30 carbons, or saturated or unsaturated hydrocarbon rings having 3 to 10 carbons, optionally having at least one heteroatom; X is the lactam-containing moiety of Formula (III) or (IV); n is from 0 to 500; ; and b is from 1 to 5.

7. The lactam-functionalized polymer of claim 2, wherein the at least one lactam-containing moiety has a general formula (II):

(II)

wherein R' and R" are identical or different and are each independently hydrogen or a substituted or unsubstituted hydrocarbon diradical optionally having at least one heteroatom, and R" is attached to a carbon atom on the lactam ring, and b is from 1 to 5 with the proviso that R' or R" or both R' and R" are a substituted or unsubstituted hydrocarbon diradical optionally having at least one heteroatom.

8. The lactam-functionalized polymer of claim 7, wherein R' and R" are identical or different and are each independently selected from the group consisting of a substituted or unsubstituted alkylene, alkenyl, aryl, alkylaryl, arylalkylene, arylalkenyl, cyclic, cycloaliphatic and polycyclic, optionally having at least one heteroatom.

9. The lactam-functionalized polymer of claim 8, wherein R' and R" are identical or different and are each independently an alkylene having 1 to 30 carbon atoms, optionally having at least one heteroatom.

10. The lactam-functionalized polymer of claim 7, wherein R' and R" are identical or different and are each independently hydrogen,

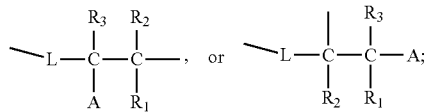

wherein L is attached to the lactam ring, and is a direct bond, or a substituted or unsubstituted alkylene optionally having at least one heteroatom; A is hydrogen, $OX_nH$, $SX_nH$, or $NR_4X_nH$ $R_1$-$R_4$ are identical or different and are each independently hydrogen, linear or branched alkyl having 1 to 30 carbons, or saturated or unsaturated hydrocarbon rings having 3 to 10 carbons, optionally having at least one heteroatom; X is the lactam-containing moiety of Formula (II); n is from 0 to 500; and b is from 1 to 5 with the proviso that R' or R" or both R' and R" are a substituted or unsubstituted hydrocarbon diradical optionally having at least one heteroatom.

11. The lactam-functionalized polymer of claim 1, wherein the polymer further comprises at least one hydrophobic moiety to form a hydrophobically modified lactam-functionalized polymer.

12. The lactam-functionalized polymer of claim 11, wherein the hydrophobically modified lactam-functionalized polymer comprises at least one hydrophobic moiety attached to at least one end of the lactam-functionalized polymer.

13. The lactam-functionalized polymer of claim 12, wherein the at least one hydrophobic moiety is selected from the group consisting of substituted or unsubstituted alkyl, alkenyl, aryl, alkylaryl, arylalkyl, arylalkenyl, cyclic, cycloaliphatic, and polycyclic, optionally having at least one heteroatom.

14. The lactam-functionalized polymer of claim 11, wherein the number of the at least one hydrophobic moiety is from 1 to 500.

15. The lactam-functionalized polymer of claim 1, wherein the number of the at least one lactam-containing moiety is from 1 to 500.

16. A method for preparing a lactam-functionalized polymer comprising:
1) reacting a hydroxyl polyether or hydroxyl polyetheramine with a gem-dihalide to form a polymer backbone; and
2) reacting the polymer backbone with at least one compound comprising at least one lactam moiety to form the lactam-functionalized polymer.

17. The method of claim 16, wherein the at least one compound further comprises at least one reactive functional group.

18. The method of claim 17, wherein the at least one compound has a general formula (V):

where Y is Cl, Br, I, F, OH, SH, or $NR_7R_8$; $R_5$ and $R_6$ are identical or different and are each independently hydrogen, Cl, Br, I, F, OH, SH, $NR_7R_8$, linear or branched alkyl having 1 to 30 carbons, or saturated or unsaturated hydrocarbon rings having 3 to 10 carbons, optionally having at least one heteroatom; $R_7$ and $R_8$ are identical or different and are each independently hydrogen, linear or branched alkyl having 1 to 30 carbons, or saturated or unsaturated hydrocarbon rings having 3 to 10 carbons, optionally having at least one heteroatom; a is from 1 to 20; and b is from 1 to 5.

19. The method of claim 17, wherein the at least one compound has a general formula (VII):

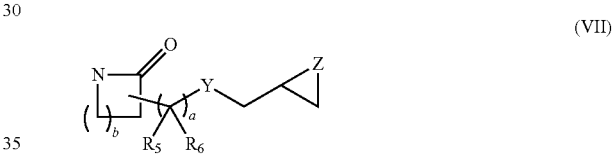

wherein Y is O, S, or $NR_7$ Z is O, S, or $NR_7$; $R_5$ and $R_6$ are identical or different and are each independently hydrogen, Cl, Br, I, F, OH, SH, $NR_7R_8$, linear or branched alkyl having 1 to 30 carbons, or saturated or unsaturated hydrocarbon rings having 3 to 10 carbons, optionally having at least one heteroatom; $R_7$ and $R_8$ are identical or different and are each independently hydrogen, linear or branched alkyl having 1 to 30 carbons, or saturated or unsaturated hydrocarbon rings having 3 to 10 carbons, optionally having at least one heteroatom; a is from 1 to 20; and b is from 1 to 5.

20. The method of claim 16, wherein the lactam-functionalized polymer further reacts with at least one compound comprising at least one hydrophobic moiety.

* * * * *